(12) United States Patent
Lee et al.

(10) Patent No.: US 7,903,091 B2
(45) Date of Patent: Mar. 8, 2011

(54) TOUCH PANEL HAVING A SPEAKER FUNCTION

(75) Inventors: Dong-Won Lee, Yongin-si (KR);
Deuk-Soo Kim, Yongin-si (KR);
Kun-Bin Lee, Suwon-si (KR);
Myung-Sook Jung, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1174 days.

(21) Appl. No.: 11/437,404

(22) Filed: May 19, 2006

(65) Prior Publication Data
US 2007/0046642 A1  Mar. 1, 2007

(30) Foreign Application Priority Data
Aug. 30, 2005  (KR) .............. 10-2005-0079752

(51) Int. Cl.
*G06F 3/041* (2006.01)
*G06K 11/06* (2006.01)
*G08C 21/00* (2006.01)

(52) U.S. Cl. .................. 345/173; 178/18.1; 178/19.07
(58) Field of Classification Search .......... 345/173; 178/18.01–19.07
See application file for complete search history.

(56) References Cited

U.S. PATENT DOCUMENTS

| | | | |
|---|---|---|---|
| 4,352,961 A * | 10/1982 | Kumada et al. | 455/350 |
| 5,357,578 A * | 10/1994 | Taniiishi | 381/354 |
| 5,515,738 A * | 5/1996 | Tamori | 73/862.46 |
| 5,852,487 A * | 12/1998 | Fujimori et al. | 349/162 |
| 6,427,017 B1 * | 7/2002 | Toki | 381/190 |
| 6,744,425 B2 * | 6/2004 | Yoshikawa et al. | 345/173 |
| 6,787,253 B2 * | 9/2004 | Iwabuchi et al. | 428/698 |
| 7,154,481 B2 * | 12/2006 | Cross et al. | 345/173 |
| 2003/0067448 A1 * | 4/2003 | Park | 345/173 |
| 2003/0067449 A1 | 4/2003 | Yoshikawa et al. | |
| 2004/0131211 A1 * | 7/2004 | Miyata et al. | 381/152 |
| 2005/0099401 A1 * | 5/2005 | Matsumoto et al. | 345/173 |
| 2005/0237685 A1 * | 10/2005 | Miyata | 361/91.1 |
| 2006/0001655 A1 * | 1/2006 | Tanabe | 345/176 |
| 2006/0227981 A1 * | 10/2006 | Miyata | 381/124 |

FOREIGN PATENT DOCUMENTS

JP  04-070100  3/1992

* cited by examiner

*Primary Examiner*—Bipin Shalwala
*Assistant Examiner*—Benyam Ketema
(74) *Attorney, Agent, or Firm*—F. Chau & Associates LLC

(57) ABSTRACT

A touch panel includes a first supporting substrate, a second supporting substrate that faces the first supporting substrate, a first transparent electrode formed on the first supporting substrate, a second transparent electrode formed on the second supporting substrate, a third transparent electrode formed between the first and second transparent electrodes, a medium layer formed between the first and third transparent electrodes, and a piezoelectric layer formed between the second and third transparent electrodes.

22 Claims, 3 Drawing Sheets

TOUCH PANEL HAVING A SPEAKER FUNCTION

CROSS-REFERENCE TO RELATED APPLICATION

This application claims priority to Korean Patent Application No. 2005-79752 filed on Aug. 30, 2005, the contents of which are incorporated by reference in their entirety herein.

BACKGROUND OF THE INVENTION

1. Technical Field

The present disclosure relates to a display apparatus having a touch panel, and more particularly to a display apparatus having a touch panel with a speaker function.

2. Discussion of the Related Art

Generally, a touch panel is used in an image display device such as, for example, a liquid crystal display (LCD) device. A touch panel can be used in place of or in combination with other input devices such as, for example, a keyboard or a mouse. The touch panel can sense positional coordinates of a finger of a user or an object pointing to a letter or an image displayed on an image display device.

There are various operating methods for a touch panel such as, for example, a capacitive overlay technology, a resistive overlay technology, an infrared beam technology, a surface acoustic wave technology, or a piezoelectric effect technology.

According to a resistive overlay technology, transparent electrodes are formed on two transparent supporting substrates. The transparent electrodes face with each other in a fixed interval. An air gap is formed between the transparent electrodes to prevent an electrical short. When an electric current flows to the transparent electrodes, a voltage is applied to each of the transparent electrodes due to resistance of the transparent electrodes. When a finger contacts the supporting substrate, the two transparent electrodes contact with each other. As a result, the resistance of the two transparent electrodes varies due to a parallel connection of the two transparent electrodes, and a voltage applied to the two transparent electrodes varies due to current flowing between the two transparent electrodes. Therefore, a touched position may be detected through a variation of the voltage.

A speaker used in a portable electric device, such as, for example, a cellular phone, personal digital assistant (PDA), and portable media player (PMP) converts an electric signal into a sound through a method employed by a conventional speaker. According to a method employed by a conventional speaker, a sound is converted into an electric signal and the electric signal is transferred to a speaker through an electric wire or an electric wave. The speaker oscillates air with a diaphragm and the oscillation of the air regenerates and transmits the sound. In this process, the conventional speaker requires a large volume and a particular shape such as, for example, a cone and an oval to cause resonance. A manufacturing process for the conventional speaker may be performed at a high temperature when the speaker includes ceramic material. Further, in a conventional technology, a touch panel and a speaker are formed separately.

SUMMARY OF THE INVENTION

Embodiments of the present invention provide a display apparatus comprising a touch panel having a speaker function.

According to an embodiment of the present invention, a touch panel includes a first supporting substrate, a second supporting substrate facing the first supporting substrate, a first transparent electrode formed on the first supporting substrate, a second transparent formed on the second supporting substrate, a third transparent electrode formed between the first and second transparent electrodes, a medium layer formed between the first and third transparent electrodes, and a piezoelectric layer formed between the second and third transparent electrodes.

Each of the first and second supporting substrates may comprise a glass substrate, a plastic substrate, an optical film or a polarizer plate.

The piezoelectric layer may include a poly vinylidene fluoride, a poly-a-methyl-l-glutamate, a poly vinyl chloride or a poly tri-fluoro ethylene.

The medium layer may include air.

The medium layer may further include a supporting member formed over the first transparent electrode.

The supporting member may be formed through a spacer scattering method, an ultraviolet irradiation method or a method of patterning an intended shape with a mold. The ultraviolet irradiation method uses an ultraviolet to pattern a shape after applying photosensitive film to an upper portion of the supporting member.

According to an embodiment of the present invention, a touch panel includes a speaker section and a touch panel section. The speaker section may include a first supporting substrate, a second supporting substrate, a first medium layer, a first transparent electrode, a second transparent, and a piezoelectric layer. The first medium can be formed adjacent to the first supporting substrate. The first transparent electrode can be formed adjacent to the first medium layer and opposite to the first supporting substrate. The second transparent electrode can be formed adjacent to the second supporting substrate. The piezoelectric substance can be formed at a position between the first and second transparent electrodes. The touch panel section may include the second supporting substrate, a third supporting substrate, a third transparent electrode, a fourth transparent electrode, and a second medium layer. The third transparent electrode can be formed adjacent to the second supporting substrate and opposite to the second transparent electrode. The fourth transparent electrode can be formed adjacent to the third supporting substrate. The second medium layer can be formed between the third transparent electrode and the fourth transparent electrode.

Each of the first supporting substrate, the second supporting substrate and the third supporting substrate may comprise a glass substrate, a plastic substrate, an optical film or a polarizer plate.

The piezoelectric layer can be a poly vinylidene fluoride, a poly-a-methyl-l-glutamate, a poly vinyl chloride or a poly tri-fluoro ethylene.

A thickness of the first medium layer can be substantially equal to or more than about 20 μm.

The first and second medium layers may include air.

The first medium layer may further include a supporting member formed on the first supporting substrate.

The second medium layer may further include a supporting member formed on the third transparent electrode.

The supporting member can be formed through a spacer scattering method, an ultraviolet irradiation method or a method of patterning an intended shape with a mold. The ultraviolet irradiation method uses an ultraviolet to pattern a shape after applying photosensitive film to an upper portion of the supporting member.

According to an embodiment of the present invention, a display apparatus includes a display panel, a driving circuit member and a touch panel. The driving circuit member applies an image signal to the display panel. The touch panel having a speaker function may include a first supporting substrate, a second supporting substrate, a first transparent electrode, a second transparent electrode, a third transparent electrode, a medium layer and a piezoelectric layer. The first transparent electrode can be formed on the first supporting substrate. The second transparent electrode can be formed on the second supporting substrate. The third transparent electrode can be formed between the first and second transparent electrodes. The medium layer can be formed between the first and third transparent electrodes. The piezoelectric layer can be formed between the second and third transparent electrodes.

Each of the first and second supporting substrates may comprise a glass substrate, a plastic substrate, an optical film, or a polarizer plate.

The piezoelectric layer may comprise a poly vinylidene fluoride, a poly-a-methyl-l-glutamate, a poly vinyl chloride or a poly tri-fluoro ethylene.

The medium layer may include air.

The touch panel according to an embodiment of the present invention includes a circuit board having signal terminals of the speaker section and the touch panel section.

BRIEF DESCRIPTION OF THE DRAWINGS

Exemplary embodiments of the present invention can be understood in more detail from the following description taken in conjunction with the accompanying drawings, in which.

DETAILED DESCRIPTION OF THE EXEMPLARY EMBODIMENTS

Exemplary embodiments of the present invention are more fully described below with reference to the accompanying drawings. The present invention may be embodied in many different forms and should not be construed as being limited to the embodiments set forth herein.

Figure 1:
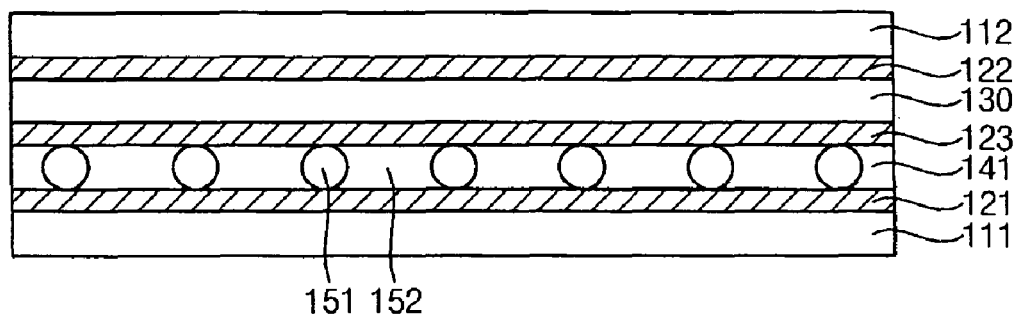
FIG. 1 is a schematic cross-sectional view illustrating a touch panel according to an embodiment of the present invention.

FIG. 1 is a schematic cross-sectional view illustrating a touch panel according to an embodiment of the present invention.

Referring to FIG. 1, a touch panel includes a first supporting substrate 111, a second supporting substrate 112, a first transparent electrode 121, a second transparent electrode 122 and a third transparent electrode 123. The first and second supporting substrates 111 and 112 include transparent glass. The first transparent electrode 121 is formed on the first supporting substrate 111. The second transparent electrode 122 is formed on the second supporting substrate 112. The third transparent electrode 123 is disposed between the first transparent electrode 121 and the second transparent electrode 122.

The touch panel further includes a piezoelectric layer 130. The piezoelectric layer 130 including, for example, a piezoelectric polymer is disposed between the second and third transparent electrodes 122 and 123. The piezoelectric polymer generates electric current when compression or oscillation is applied thereto, and oscillates when a voltage is applied to the piezoelectric polymer. The touch panel further includes a medium layer 141. The medium layer 141 is disposed between the first and third transparent electrodes 121 and 123. The medium layer 141 electrically insulates the first and third transparent electrodes 121 and 123, and activates oscillation.

A first supporting substrate 111 and a second supporting substrate 112 generally include transparent glass. Alternatively, the first supporting substrate 111 and the second support substrate 112 may include, for example, transparent plastic, an optical film, and a polarizer plate.

A film speaker (not shown) is a functional speaker using a poly vinylidene fluoride (PVDF) as a substance of a speaker through a surface reforming technology. The surface reforming technology converts a surface of a material into a surface having a hydrophilic property or a hydrophobic property using plasma. The PVDF may be employed as a speaker by converting a surface of the PVDF into plastic having a piezoelectric property.

The film speaker generally includes two supporting substrates, an oscillation activating layer, spacers, an upper transparent electrode, a lower transparent electrode and a piezoelectric layer. The two supporting substrates can be transparent. The oscillation activating layer induces resonances, when an electric signal is applied thereto, and amplifies oscillation. The spacers support a gap formed in the oscillation activating layer. The upper and lower transparent electrodes are disposed between the oscillation activating layer and an upper supporting substrate. The piezoelectric layer is disposed between the upper and lower transparent electrodes. The piezoelectric layer generates electricity when compression or oscillation is applied thereto and oscillates when a voltage is applied to the piezoelectric layer.

The piezoelectric layer 130 may include a piezoelectric polymer, such as, for example, a poly vinylidene fluoride, a poly-a-methyl-l-glutamate, a poly vinyl chloride and a poly tri-fluoro ethylene.

The piezoelectric polymer is deposited on a surface of the supporting substrate through the surface reforming technology that converts properties of the surface into hydrophilic or hydrophobic properties.

The first transparent electrode 121, the second transparent electrode 122 and the third transparent electrode 123 include electrically conductive and optically transparent materials, such as, for example, indium tin oxide (ITO) or indium zinc oxide (IZO). Therefore, light may pass through the first transparent electrode 121, the second transparent electrode 122 and the third transparent electrode 123, and an electric signal may be transferred through the first, second and third transparent electrodes 121, 122, and 123.

The first transparent electrode 121 and the third transparent electrode 123 transfer an electric signal to the touch panel. The third transparent electrode 123 and the second transparent electrode 122 transfer an electric signal to the film speaker.

The medium layer 141 formed between the first transparent electrode 121 and the third transparent electrode 123 includes an air gap 152 having a fixed distance. Thus the medium layer 141 prevents an electrical short between the first and third transparent electrodes 121 and 123. The medium layer 141 converts an oscillation delivered from the piezoelectric polymer into a sound through resonance and amplification of the oscillation.

The distance of the air gap 152 is substantially equal to or more than about 20 μm to effectively induce resonance and amplify oscillation and to convert the oscillation into a sound. A supporting member 151 is formed between the first transparent electrode 121 and the third transparent electrode 123 so that the distance of the air gap 152 is maintained. The supporting member 151 can be elastic, so that the supporting member 151 may relieve an impact applied to the touch panel when a user touches the touch panel, and may restore an electrical short to an open state when an electrical short between the first and third transparent electrodes 121 and 123 occurs.

The supporting member 151 may be formed through, for example, a spacer scattering method, an ultraviolet irradiation method, or a method of patterning an intended shape with a mold. The ultraviolet irradiation method uses an ultraviolet light to pattern a shape after applying a photosensitive film to an upper portion of the supporting member 151.

The touch panel according to an embodiment of the present invention prevents an electrical short among transparent electrodes through the medium layer 141. The medium layer 141 of the touch panel induces resonance and amplifies oscillation delivered from the piezoelectric layer 130 having a piezoelectric polymer material.

According to an embodiment of the present invention, a first voltage (e.g., reference voltage) is applied to a third transparent electrode 123, and a second voltage is applied to a first transparent electrode 121. When the first and third transparent electrodes 121 and 123 are in an electrical short or an open state, the touch panel determines an external force from a current difference. When the second supporting substrate 112 is bent due to a user's touch, the third transparent electrode 123 contacts the first transparent electrode 121 to change resistance and current between the first and second transparent electrodes 121 and 122. Therefore, the touch panel according to an embodiment of the present invention detects positional coordinates of a finger of a user or an object pointing to a letter or an image displayed.

Based on the first voltage, a third voltage varying in accordance with sound change is applied to the second transparent electrode 122. The piezoelectric layer 130 including the piezoelectric polymer material applies different oscillations to the medium layer 141 according to a potential difference between the first voltage and the third voltage. Therefore the piezoelectric layer 130 can be used for a speaker function.

Figure 2:
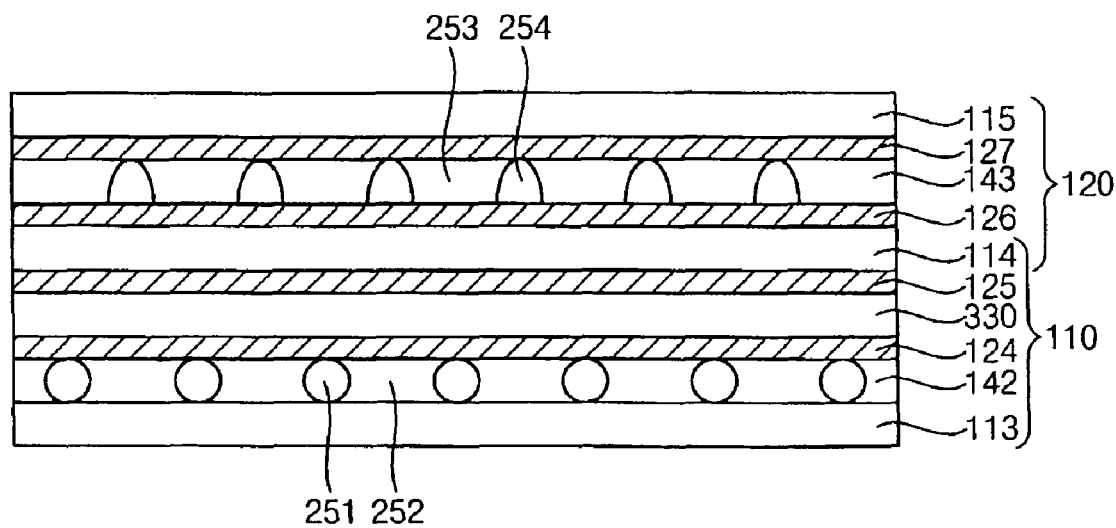
FIG. 2 is a schematic cross-sectional view illustrating a touch panel according to an embodiment of the present invention.

FIG. 2 is a schematic cross-sectional view illustrating a touch panel according to an embodiment of the present invention.

Referring to FIG. 2, a touch panel includes a speaker section 110 and a touch panel section 120. The speaker section 110 includes a first supporting substrate 113, a second supporting substrate 114, a first medium layer 142, a first transparent electrode 124, a second transparent electrode 125, and a piezoelectric layer 330. The first medium layer 142 is formed on the first supporting substrate 113. The first transparent electrode 124 is formed on the first medium layer 142. The first medium layer 142 is disposed between the first supporting substrate 113 and the first transparent electrode 124. The piezoelectric layer 330 is formed on the first transparent electrode 124. The piezoelectric layer 330 is formed between the first and second transparent electrodes 124 and 125 and includes a piezoelectric polymer material. The second supporting substrate 114 is formed on the second transparent electrode 125.

The touch panel section 120 includes the second supporting substrate 114, a third supporting substrate 115, a third transparent electrode 126, a fourth transparent electrode 127 and a second medium layer 143. The third transparent electrode 126 is formed on the second supporting substrate 114. The second medium layer 143 is formed on the third transparent electrode 126. The fourth transparent electrode 127 is formed on the second medium layer 143. The third supporting layer 115 is formed on the fourth transparent electrode 127.

The second supporting substrate 114 can be commonly included in both the speaker section 110 and the touch panel section 120.

The first medium layer 142 of the speaker section 110 includes a first air gap 252 that induces resonance and amplifies oscillation of piezoelectric polymer materials. The air gap 252 is in a range of substantially equal to or more than about 20 μm. The second medium layer 143 of the touch panel section 120 includes a second air gap 253 that prevents an electrical short between the third transparent electrode 126 and a fourth transparent electrode 127.

The first and second medium layers 142 and 143 include a first supporting member 251 and a second supporting member 254 to maintain the distance between the first and second air gaps 252 and 253, respectively. The first supporting member 251 and the second supporting member 254 may be formed through, for example, a spacer scattering method or an ultraviolet irradiation method. The first supporting member 251 and the second supporting member 254 may have various shapes.

Figure 3:
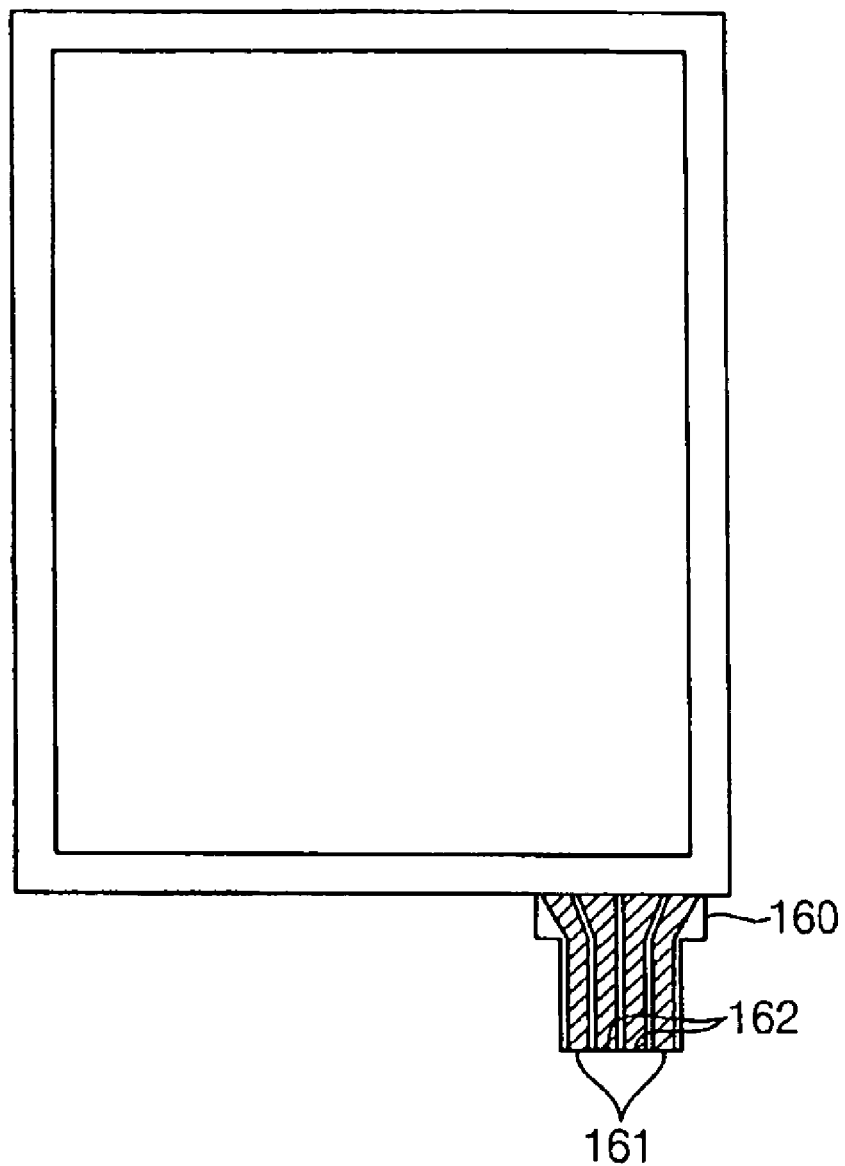
FIG. 3 is a plan view illustrating a touch panel according to an embodiment of the present invention.

FIG. 3 is a plan view illustrating a touch panel according to an embodiment of the present invention.

A circuit board 160 includes a speaker section signal terminal 161 and a touch panel section signal terminal 162. When an electric signal is applied to the speaker section signal terminal 161, the electric signal is converted into oscillation through piezoelectric polymer materials of a medium layer. The medium layer induces resonance and amplifies the oscillation. Thus the oscillation is converted into a sound.

A fixed voltage is applied to the touch panel section 120 through the touch panel section signal terminal 162, and variation of current induced by a user's touch is outputted.

Figure 4:
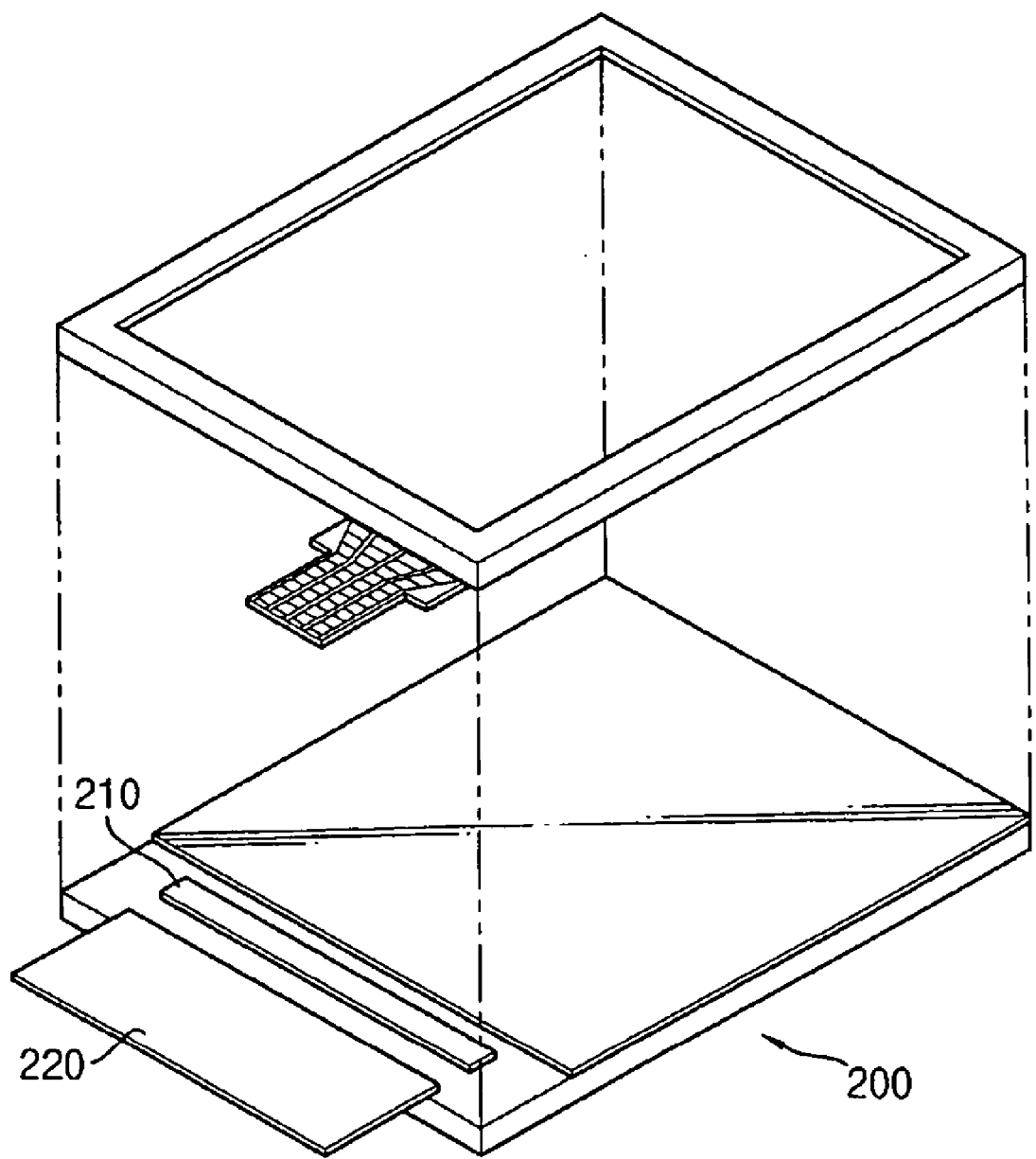
FIG. 4 is an exploded perspective view illustrating a method of coupling a touch panel with a display panel according to an embodiment of the present invention.

FIG. 4 is an exploded perspective view showing a method of assembling a touch panel with a display panel according to an embodiment of the present invention.

An image signal and a control signal outputted from a flexible printed circuit film 220 and a driver IC 210 are applied to a display panel 200 to display an image.

The touch panel according to embodiments of the present invention has a speaker function and a touch panel function. The touch panel having a speaker function is disposed on the display panel 200 so that a user may easily touch the touch panel. The circuit board 160 of the touch panel having a speaker function is electrically connected to the flexible printed circuit film 220. The flexible printed circuit film 220 applies an image signal and a control signal to the display panel 200. Thus an electric signal is applied to the circuit board 160 of the touch panel.

The touch panel according to embodiments of the present invention lowers manufacturing costs and simplifies manufacturing processes because the touch panel has both functions of a touch panel and a speaker. The touch panel according to embodiments of the present invention can be used in a display apparatus with high resolution such as, for example, a portable electric device.

Although exemplary embodiments of the present invention have been described with reference to the accompanying drawings, it is to be understood that the present invention should not be limited to these precise embodiments but various changes and modifications can be made by one skilled in the art without departing from the spirit and scope of the present invention as hereinafter claimed.

What is claimed is:

1. A touch panel comprising:
   a first supporting substrate;
   a second supporting substrate that faces the first supporting substrate;
   a first transparent electrode formed on the first supporting substrate;
   a second transparent electrode formed on the second supporting substrate;
   a third transparent electrode formed between the first and second transparent electrodes;
   a medium layer formed between the first and third transparent electrodes; and
   a piezoelectric layer formed between the second and third transparent electrodes, wherein a first surface of the piezoelectric layer is in direct contact with the second transparent electrode, and a second surface of the piezoelectric layer opposing the first surface is in direct contact with the third transparent electrode.

2. The touch panel of claim 1, wherein each of the first and second supporting substrates comprises a glass substrate, a plastic substrate, an optical film or a polarizer.

3. The touch panel of claim 1, wherein the piezoelectric layer comprises a poly vinylidene fluoride, a poly-a-methyl-l-glutamate, a poly vinyl chloride or a poly tri-fluoro ethylene.

4. The touch panel of claim 1, wherein a thickness of the medium layer is substantially equal to or more than about 20 μm.

5. The touch panel of claim 1, wherein the medium layer includes air.

6. The touch panel of claim 1, wherein the medium layer further comprises a supporting member disposed between the first and third transparent electrodes.

7. The touch panel of claim 6, wherein the supporting member is formed through a spacer scattering method.

8. The touch panel of claim 6, wherein the supporting member is formed through irradiating ultraviolet light after applying a photosensitive film.

9. The touch panel of claim 6, wherein the supporting member is formed using a mold after applying a photosensitive film.

10. A touch panel comprising:
    a speaker section comprising:
      a first supporting substrate;
      a second supporting substrate that faces the first supporting substrate;
      a first medium layer formed on the first supporting substrate, the first medium layer having a first supporting member;
      a first transparent electrode formed adjacent to the first medium layer and opposite to the first supporting substrate;
      a second transparent electrode formed adjacent to the second supporting substrate; and
      a piezoelectric layer formed between the first and second transparent electrodes, wherein the first medium layer converts an oscillation received from the piezoelectric layer into a sound through resonance and amplification of the oscillation; and
    a touch panel section comprising:
      the second supporting substrate;
      a third supporting substrate formed opposite to the second supporting substrate;
      a third transparent electrode formed adjacent to the second supporting substrate and opposite to the second transparent electrode;
      a fourth transparent electrode formed adjacent to the third transparent electrode; and
      a second medium layer formed between the third and the fourth transparent electrodes.

11. The touch panel of claim 10, wherein each of the first supporting substrate, the second supporting substrate and the third supporting substrate comprises a glass substrate, a plastic substrate, an optical film or a polarizer.

12. The touch panel of claim 10, wherein the piezoelectric layer comprises a poly vinylidene fluoride, a poly-a-methyl-l-glutamate, a poly vinyl chloride or a poly tri-fluoro ethylene.

13. The touch panel of claim 10, wherein a thickness of the first medium layer is equal to or more than about 20 μm.

14. The touch panel of claim 10, wherein the first medium layer and the second medium layer include air.

15. The touch panel of claim 10, wherein the second medium layer further includes a second supporting member formed on the third transparent electrode.

16. The touch panel of claim 15, wherein the first supporting member and the second supporting member are formed through a spacer scattering method.

17. The touch panel of claim 15, wherein the first supporting member and the second supporting member are formed through irradiating ultraviolet light after applying a photosensitive film.

18. The touch panel of claim 15, wherein the first supporting member and the second supporting member are formed using a mold after applying a photosensitive film.

19. A liquid crystal display apparatus, comprising:
    a display panel;
    a driving circuit member applying an image signal to the display panel; and
    a touch panel, comprising:
      a first supporting substrate;
      a second supporting substrate that faces the first supporting substrate;
      a first transparent electrode formed on the first supporting substrate;
      a second transparent electrode formed on the second supporting substrate;
      a third transparent electrode formed between the first and second transparent electrodes;
      a medium layer formed between the first and third transparent electrodes; and
      a piezoelectric layer formed between the second and third transparent electrodes, wherein a first surface of the piezoelectric layer is in direct contact with the second transparent electrode, and a second surface of the piezoelectric layer opposing the first surface is in direct contact with the third transparent electrode.

20. The liquid crystal display apparatus of claim 19, wherein each of the first supporting substrate and the second supporting substrate comprises a glass substrate, a plastic substrate, an optical film, or a polarizer.

21. The liquid crystal display apparatus of claim 19, wherein the piezoelectric layer comprises a poly vinylidene fluoride, a poly-a-methyl-l-glutamate, a poly vinyl chloride or a poly tri-fluoro ethylene.

22. The liquid crystal display apparatus of claim 19, wherein the medium layer includes air.

* * * * *